United States Patent
Ahmed (10) Patent No.: US 12,358,810 B1
(45) Date of Patent: Jul. 15, 2025

(54) Co3O4/CuO/MgO and (Cu0.97Co0.03)O/MgO/CoO NANOCOMPOSITES AND METHOD OF PECHINI SOL-GEL FABRICATING (71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/050,708

(22) Filed: Feb. 11, 2025

(51) Int. Cl.
*C01G 51/04* (2025.01)

(52) U.S. Cl.
CPC .......... *C01G 51/04* (2013.01); *C01P 2002/60* (2013.01); *C01P 2004/64* (2013.01); *C01P 2004/82* (2013.01)

(58) Field of Classification Search
CPC ... C01G 51/04; C01G 3/02; C01F 5/02; B01J 23/72; B01J 23/75
See application file for complete search history.

(56) References Cited

FOREIGN PATENT DOCUMENTS

| CN | 113786835 B | 3/2023 |
| CN | 116920850 A | 10/2023 |

OTHER PUBLICATIONS

English machine translation of CN116920850A (2023).*
Domaradzki, Kamil, et al. "Influence of hydrogen on a nanocrystalline high-entropy oxide with application potential in hydrogen technologies." Ceramics International 49.10 (2023): 15544-15552.*
Jain, Shruti, Shubha Jain, and Divya Verma. "Novel ZnO—Co3O4—CuO Nanocomposite Catalyzed Microwave-Assisted Facile Synthesis of Polyhydroquinoline Derivatives." Applied Organometallic Chemistry 39.2 (2025): e7835.*
Aziz, Shadha Nasser, et al. "Synthesis, characterization, and evaluation of antibacterial and antifungal activities of CuO—ZnO—Co3O4 nanocomposites." Heliyon 10.18 (2024).*
Salman, Wafaa K., and Najwa J. Jubier. "Structural and Optical Properties Study of Cobalt Oxide and Copper Oxide Composite: Energy Band Gap Evaluation." Journal of Physics: Conference Series. vol. 2974. No. 1. IOP Publishing, 2025.*

(Continued)

*Primary Examiner* — Richard M Rump
(74) *Attorney, Agent, or Firm* — Oblon, McClelland, Maier & Neustadt, L.L.P.

(57) ABSTRACT

A $Co_3O_4$/CuO/MgO nanocomposite material includes cubic $Co_3O_4$ crystalline phases; monoclinic CuO crystalline phases; and cubic MgO crystalline phases. The average crystallite size of the $Co_3O_4$/CuO/MgO nanocomposite material is in a range from 50 to 70 nm, and the $Co_3O_4$/CuO/MgO nanocomposite material has a granular morphology comprising granular particles with an average diameter in a range from 75 to 95 nm.

20 Claims, 5 Drawing Sheets

50 →

Add a tartaric acid solution to a solution of magnesium nitrate hexahydrate ($Mg(NO_3)_2 \cdot 6H_2O$), cobalt acetate tetrahydrate ($Co(CH_3COO)_2 \cdot 4H_2O$), and copper acetate monohydrate ($Cu(CH_3COO)_2 \cdot H_2O$) under stirring to form a reaction mixture — 52

Add polyethylene glycol 400 to the reaction mixture to form a stabilized mixture and stirring at 250 °C until complete evaporation of water, to form a solid — 54

Calcinate the solid at a temperature in a range from 550 to 650 °C for 2 to 4 hours to form the $Co_3O_4$/CuO/MgO nanocomposite material — 56

(56) References Cited

OTHER PUBLICATIONS

Shashikanth, F. Winfred, and C. Senthilkumar. "Enhanced room temperature ferromagnetism in cobalt-doped copper oxide nanoparticles: synthesis and characterization." Brazilian Journal of Physics 54.2 (2024): 44.*

Shuang Zhang, et al., "Base-free oxidation of HMF to FDCA over Ru/Cu—Co—O MgO under aqueous conditions", Molecules, vol. 29. Issue 13. Jul. 8, 2024 (16 pages).

Hari Prasad Reddy Kannapu, et al., "Nano CoO—Cu—MgO catalyst for vapor phase simultaneous synthesis of ortho-chloroaniline and γ-butyrolactone from ortho-cholonitrobenzne and 1,4-butanediol", Characterization and Application of Nanomaterials. vol. 4, Issue 1. Jan. 11, 2021(10 pages).

Grigory B. Veselov, et al., "Sol-gel prepared Co—Mg—O oxide systems: redox behavior, thermal stability and catalytic performance in CO oxidation", Reaction Kinetics, Mechanisms and Catalysis, vol. 136, Dec. 18, 2023, pp. 233-250 (18 pages).

M.R. Loghman-Estarki, et al., "Effect of annealing temperature and copper mole ratio on the morphology, structure and magnetic properties of Mg0.5-xCuxZnD.5Fe2O4 nanoparticles prepared by the modified Pechini method", Journal of Magnetism and Magnetic Materials, vol. 442, Nov. 15, 2017, pp. 182-175 (7 pages).

* cited by examiner

50 ⇘

```
┌─────────────────────────────────────────────┐
│ Add a tartaric acid solution to a solution of magnesium │
│ nitrate hexahydrate (Mg(NO$_3$)$_2$·6H$_2$O), cobalt acetate │
│ tetrahydrate (Co(CH$_3$COO)$_2$·4H$_2$O), and copper acetate │
│ monohydrate (Cu(CH$_3$COO)$_2$·H$_2$O) under stirring to │
│ form a reaction mixture                     │
└─────────────────────────────────────────────┘ — 52
                      ↓
┌─────────────────────────────────────────────┐
│ Add polyethylene glycol 400 to the reaction mixture to │
│ form a stabilized mixture and stirring at 250 °C until │
│ complete evaporation of water, to form a solid │
└─────────────────────────────────────────────┘ — 54
                      ↓
┌─────────────────────────────────────────────┐
│ Calcinate the solid at a temperature in a range from 550 │
│ to 650 °C for 2 to 4 hours to form the Co$_3$O$_4$/CuO/MgO │
│ nanocomposite material                      │
└─────────────────────────────────────────────┘ — 56
```

```
┌─────────────────────────────────────────────┐
│ Add a tartaric acid solution to a solution of magnesium │
│ nitrate hexahydrate (Mg(NO$_3$)$_2$·6H$_2$O), cobalt acetate │
│ tetrahydrate (Co(CH$_3$COO)$_2$·4H$_2$O), and copper acetate │
│ monohydrate (Cu(CH$_3$COO)$_2$·H$_2$O) under stirring to │
│ form a reaction mixture                     │
└─────────────────────────────────────────────┘ — 72
                      ↓
┌─────────────────────────────────────────────┐
│ Add polyethylene glycol 400 to the reaction mixture to │
│ form a stabilized mixture and stirring at 250 °C until │
│ complete evaporation of water, to form a solid │
└─────────────────────────────────────────────┘ — 74
                      ↓
┌─────────────────────────────────────────────┐
│ Calcinate the solid at a temperature in a range from │
│ 750 to 850 °C for 2 to 4 hours to form the │
│ (Cu0.97Co0.03)O/MgO/CoO nanocomposite material │
└─────────────────────────────────────────────┘ — 76
```

Co3O4/CuO/MgO and (Cu0.97Co0.03)O/MgO/CoO NANOCOMPOSITES AND METHOD OF PECHINI SOL-GEL FABRICATING

BACKGROUND

Technical Field

The present disclosure is directed to nanocomposites, more particularly, to $Co_3O_4$/CuO/MgO and $(Cu_{0.97}Co_{0.03})$O/MgO/CoO nanocomposites fabricated using a Pechini sol-gel method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Developing advanced nanomaterials is challenging for the industrial, biological, and medicinal industries. Notably, nanoparticles are used in various fields such as catalysis, sensing, drug delivery, and painting technologies. The present disclosure discloses a multi-phase nanocomposite material ($Co_3O_4$/CuO/MgO nanocomposite material) that integrates $Co_3O_4$, CuO, MgO, and $(Cu_{0.97}Co_{0.03})$O phases into thermally stable structures, which exhibit unique structural, morphological, and compositional properties not adequately achieved by current materials.

Current technologies often fail to deliver multi-phase composites with controlled particle size, uniform morphology, and high crystallinity, which limits their functional applications in catalysis, energy storage, and environmental remediation. Existing research has explored the Pechini sol-gel method for synthesizing single-phase or binary-phase nanomaterials, but does not include the innovative integration of multiple active phases within a single composite.

Accordingly, an object of the present disclosure is to address the limitations of the prior art by developing a nanocomposite material with improved phase integration and atomic distribution—thereby expanding its functional applications in fields such as catalysis, environmental remediation, and energy storage.

SUMMARY

In an exemplary embodiment, a $Co_3O_4$/CuO/MgO nanocomposite material is described. The $Co_3O_4$/CuO/MgO nanocomposite material includes cubic $Co_3O_4$ crystalline phases, monoclinic CuO crystalline phases, and cubic MgO crystalline phases. The average crystallite size of the $Co_3O_4$/CuO/MgO nanocomposite material is in a range from 50 to 70 nm, and the $Co_3O_4$/CuO/MgO nanocomposite material has a granular morphology comprising granular particles with an average diameter in a range from 75 to 95 nm.

In some embodiments, the average crystallite size of the $Co_3O_4$/CuO/MgO nanocomposite material is in a range from 55 to 65 nm.

In some embodiments, the average diameter of the granular particles is in a range from 80 to 90 nm.

In some embodiments, the atomic concentration of cobalt in the $Co_3O_4$/CuO/MgO nanocomposite material is in a range from 20 to 25% of the total number of atoms, the atomic concentration of copper in the $Co_3O_4$/CuO/MgO nanocomposite material is in a range from 20 to 25% of the total number of atoms, and the atomic concentration of magnesium in the $Co_3O_4$/CuO/MgO nanocomposite material is in a range from 12 to 18% of the total number of atoms.

In some embodiments, the atomic concentration of cobalt in the $Co_3O_4$/CuO/MgO nanocomposite material is in a range from 23 to 24.5% of the total number of atoms, the atomic concentration of copper in the $Co_3O_4$/CuO/MgO nanocomposite material is in a range from 22 to 24% of the total number of atoms, and the atomic concentration of magnesium in the $Co_3O_4$/CuO/MgO nanocomposite material is in a range from 13 to 15% of the total number of atoms.

In an exemplary embodiment, a $(Cu_{0.97}Co_{0.03})$O/MgO/CoO nanocomposite material is described. The $(Cu_{0.97}Co_{0.03})$O/MgO/CoO nanocomposite material includes cubic CoO crystalline phases, monoclinic $(Cu_{0.97}Co_{0.03})$O crystalline phases, and cubic MgO crystalline phases. The average crystallite size of the $(Cu_{0.97}Co_{0.03})$O/MgO/CoO nanocomposite material is in a range from 45 to 65 nm, and the $(Cu_{0.97}Co_{0.03})$O/MgO/CoO nanocomposite material has a granular morphology comprising granular particles with an average diameter in a range from 140 to 170 nm.

In some embodiments, the average crystallite size of the $(Cu_{0.97}Co_{0.03})$O/MgO/CoO nanocomposite material is in a range from 50 to 60 nm.

In some embodiments, the average diameter of the granular particles is in a range from 150 to 160 nm.

In some embodiments, the atomic concentration of cobalt in the $(Cu_{0.97}Co_{0.03})$O/MgO/CoO nanocomposite material is in a range from 25 to 30% of the total number of atoms, the atomic concentration of copper in the $(Cu_{0.97}Co_{0.03})$O/MgO/CoO nanocomposite material is in a range from 18 to 23% of the total number of atoms, and the atomic concentration of magnesium in the $(Cu_{0.97}Co_{0.03})$O/MgO/CoO nanocomposite material is in a range from 15 to 20% of the total number of atoms.

In some embodiments, the atomic concentration of cobalt in the $(Cu_{0.97}Co_{0.03})$O/MgO/CoO nanocomposite material is in a range from 26 to 28% of the total number of atoms, the atomic concentration of copper in the $(Cu_{0.97}Co_{0.03})$O/MgO/CoO nanocomposite material is in a range from 20 to 22% of the total number of atoms, and the atomic concentration of magnesium in the $(Cu_{0.97}Co_{0.03})$O/MgO/CoO nanocomposite material is in a range from 16-18% of the total number of atoms.

In an exemplary embodiment, a method for making the $Co_3O_4$/CuO/MgO nanocomposite material is described. The method includes adding a tartaric acid solution to a solution of magnesium nitrate hexahydrate ($Mg(NO_3)_2 \cdot 6H_2O$), cobalt acetate tetrahydrate ($Co(CH_3COO)_2 \cdot 4H_2O$), and copper acetate monohydrate ($Cu(CH_3COO)_2 \cdot H_2O$) under stirring to form a reaction mixture, adding polyethylene glycol 400 to the reaction mixture to form a stabilized mixture and stirring at 250° C. until complete evaporation of water, forming a solid, and calcining the solid at a temperature in a range from 550 to 650° C. for 2 to 4 hours to form the $Co_3O_4$/CuO/MgO nanocomposite material.

In some embodiments, the solid is calcined at a temperature in a range from 575 to 625° C. for 2 to 4 hours to form the $Co_3O_4$/CuO/MgO nanocomposite material.

In some embodiments, the solid is calcined at 600° C. for 3 hours to form the $Co_3O_4$/CuO/MgO nanocomposite material.

In some embodiments, the concentration of tartaric acid in the reaction mixture is in a range from 150 to 170 g/L, the concentration of $Mg(NO_3)_2·6H_2O$ in the reaction mixture is in a range from 75 to 85 g/L, the concentration of $Co(CH_3COO)_2·4H_2O$ in the reaction mixture is in a range from 75 to 85 g/L, and the concentration of $Cu(CH_3COO)_2·H_2O$ in the reaction mixture is in a range from 75 to 85 g/L.

In some embodiments, the concentration of polyethylene glycol 400 in the stabilized mixture is in a range from 50 to 60 ml per liter of stabilized mixture.

In an exemplary embodiment, a method for making the $(Cu_{0.97}Co_{0.03})O$/MgO/CoO nanocomposite material is described. The method includes adding a tartaric acid solution to a solution of magnesium nitrate hexahydrate ($Mg(NO_3)_2·6H_2O$), cobalt acetate tetrahydrate ($Co(CH_3COO)_2·4H_2O$), and copper acetate monohydrate ($Cu(CH_3COO)_2·H_2O$) under stirring to form a reaction mixture, adding polyethylene glycol 400 to the reaction mixture to form a stabilized mixture and stirring at 250° C. until complete evaporation of water, forming a solid, and calcining the solid at a temperature in a range from 750 to 850° C. for 2 to 4 hours to form the $(Cu_{0.97}Co_{0.03})O$/MgO/CoO nanocomposite material.

In some embodiments, the solid is calcined at a temperature in a range from 775 to 825° C. for 2 to 4 hours to form the $(Cu_{0.97}Co_{0.03})O$/MgO/CoO nanocomposite material.

In some embodiments, the solid is calcined at 800° C. for 3 hours to form the $(Cu_{0.97}Co_{0.03})O$/MgO/CoO nanocomposite material.

In some embodiments, the concentration of tartaric acid in the reaction mixture is in a range from 150 to 170 g/L, the concentration of $Mg(NO_3)_2·6H_2O$ in the reaction mixture is in a range from 75 to 85 g/L, the concentration of $Co(CH_3COO)_2·4H_2O$ in the reaction mixture is in a range from 75 to 85 g/L, and the concentration of $Cu(CH_3COO)_2·H_2O$ in the reaction mixture is in a range from 75 to 85 g/L.

In some embodiments, the concentration of polyethylene glycol 400 in the stabilized mixture is in a range from 50 to 60 ml per liter of stabilized mixture.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "nanocomposite" refers to a material composed of at least two different components: a matrix and nanoparticles that are incorporated into or dispersed within the matrix. The nanoparticles typically have at least one dimension in the nanometer range (typically 1 to 100 nm) and are used to enhance or modify the properties of the matrix material. Nanocomposites can exhibit unique mechanical, electrical, thermal, optical, or chemical properties that are distinct from those of the individual components.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "atomic concentration" refers to the proportion or percentage of a specific element in a material, calculated based on the number of atoms of that element relative to the total number of atoms present in the material. It is typically expressed as a percentage (%) or as an atomic fraction. Atomic concentration provides insight into the composition of the material, reflecting the relative abundance of a particular element within a mixture or compound. This measurement is often determined using techniques such as X-ray fluorescence (XRF), energy-dispersive X-ray spectroscopy (EDS), or inductively coupled plasma mass spectrometry (ICP-MS).

Aspects of this disclosure pertain to $Co_3O_4/CuO/MgO$ and $(Cu_{0.97}Co_{0.03})O/MgO/CoO$ nanocomposites fabricated using the Pechini sol-gel method. The use of the Pechini sol-gel method for fabricating $Co_3O_4/CuO/MgO$ and $(Cu_{0.97}Co_{0.03})O/MgO/CoO$ nanocomposites offers precise control over composition, thereby enhancing material properties for various applications such as catalysis, energy storage, and environmental remediation.

According to a first aspect of the present disclosure, a $Co_3O_4/CuO/MgO$ nanocomposite material is described. In some embodiments, the nanocomposite material may include crystalline phases, but is not limited to quartz, calcite, hematite, magnetite, goethite, dolomite, albite, anorthite, pyrite, fluorite, halite, barite, apatite, rutile, and zircon. In a preferred embodiment, the $Co_3O_4/CuO/MgO$ nanocomposite exhibits cubic $Co_3O_4$ crystalline phases, monoclinic CuO crystalline phases, and cubic MgO crystalline phases.

In some embodiments, the average crystallite size of the $Co_3O_4/CuO/MgO$ nanocomposite material is within the range of 30 to 90 nm, 50 to 70 nm, including subranges such as 50-51 nm, 51-52 nm, 52-53 nm, 53-54 nm, 54-55 nm, 55-56 nm, 56-57 nm, 57-58 nm, 58-59 nm, 59-60 nm, 60-61 nm, 61-62 nm, 62-63 nm, 63-64 nm, 64-65 nm, 65-66 nm, 66-67 nm, 67-68 nm, 68-69 nm, and 69-70 nm. Broader ranges include 50-55 nm, 55-60 nm, 60-65 nm, 65-70 nm, 50-60 nm, and 60-70 nm, along with finer intervals such as 50-52.5 nm, 52.5-55 nm, 55-57.5 nm, and 67.5-70 nm. In a preferred embodiment, the average crystallite size is about 59.66 nm.

In some embodiments, the morphology of the nanocomposite material includes diverse nanostructures such as nanowires, nanospheres, nanosheets, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures. In a preferred embodiment, the nanocomposite material exhibits spherical and rounded particles.

In some embodiments, the $Co_3O_4/CuO/MgO$ nanocomposite material demonstrates a granular morphology with granular particles having an average diameter ranging from 55 to 115 nm, 75 to 95 nm. Specific subranges include 75-76 nm, 76-77 nm, 77-78 nm, 78-79 nm, 79-80 nm, 80-81 nm, 81-82 nm, 82-83 nm, 83-84 nm, 84-85 nm, 85-86 nm, 86-87 nm, 87-88 nm, 88-89 nm, 89-90 nm, 90-91 nm, 91-92 nm, 92-93 nm, 93-94 nm, and 94-95 nm, as well as broader ranges such as 75-77 nm, 77-79 nm, 79-81 nm, 81-83 nm, 83-85 nm, 85-87 nm, 87-89 nm, 89-91 nm, 91-93 nm, and 93-95 nm. In a preferred embodiment, the average diameter of the granular particles is 85.37 nm.

In some embodiments, the atomic concentration of cobalt in the $Co_3O_4/CuO/MgO$ nanocomposite material ranges from 10 to 35%, 20 to 25%, with subranges such as 20-20.2%, 20.2-20.4%, 20.4-20.6%, 20.6-20.8%, 20.8-21%, 21-21.2%, 21.2-21.4%, 21.4-21.6%, 21.6-21.8%, 21.8-22%, 22-22.2%, 22.2-22.4%, 22.4-22.6%, 22.6-22.8%, 22.8-23%, 23-23.2%, 23.2-23.4%, 23.4-23.6%, 23.6-23.8%, 23.8-24%, 24-24.2%, 24.2-24.4%, 24.4-24.6%, 24.6-24.8%, 24.8-25%, 20-21%, 21-22%, 22-23%, 23-24%, and 24-25%. In a preferred embodiment, the atomic concentration of cobalt is 23.70% of the total number of atoms.

In some embodiments, the atomic concentration of copper in the $Co_3O_4/CuO/MgO$ nanocomposite material ranges from 10 to 35%, 20 to 25%, with subranges such as 20-20.2%, 20.2-20.4%, 20.4-20.6%, 20.6-20.8%, 20.8-21%, 21-21.2%, 21.2-21.4%, 21.4-21.6%, 21.6-21.8%, 21.8-22%, 22-22.2%, 22.2-22.4%, 22.4-22.6%, 22.6-22.8%, 22.8-23%, 23-23.2%, 23.2-23.4%, 23.4-23.6%, 23.6-23.8%, 23.8-24%, 24-24.2%, 24.2-24.4%, 24.4-24.6%, 24.6-24.8%, 24.8-25%, 20-21%, 21-22%, 22-23%, 23-24%, and 24-25%. In a preferred embodiment, the atomic concentration of copper is 22.90% of the total number of atoms.

In some embodiments, the atomic concentration of magnesium in the $Co_3O_4/CuO/MgO$ nanocomposite material ranges from 5 to 25%, 12 to 18%, with subranges such as 12-12.2%, 12.2-12.4%, 12.4-12.6%, 12.6-12.8%, 12.8-13%, 13-13.2%, 13.2-13.4%, 13.4-13.6%, 13.6-13.8%, 13.8-14%, 14-14.2%, 14.2-14.4%, 14.4-14.6%, 14.6-14.8%, 14.8-15%, 15-15.2%, 15.2-15.4%, 15.4-15.6%, 15.6-15.8%, 15.8-16%, 16-16.2%, 16.2-16.4%, 16.4-16.6%, 16.6-16.8%, 16.8-17%, 17-17.2%, 17.2-17.4%, 17.4-17.6%, 17.6-17.8%, and 17.8-18%. In a preferred embodiment, the atomic concentration of magnesium is 14.20% of the total number of atoms.

The mass ratio of $Co_3O_4$, CuO, MgO in the $Co_3O_4/CuO/MgO$ nanocomposite is preferably 0.5-1.5:0.5-1.5:0.2-1.5, 0.25-1:0.25-1:0.25-1, or about 0.5-0.75:0.5-0.75:0.5-0.75.

Figure 1A:
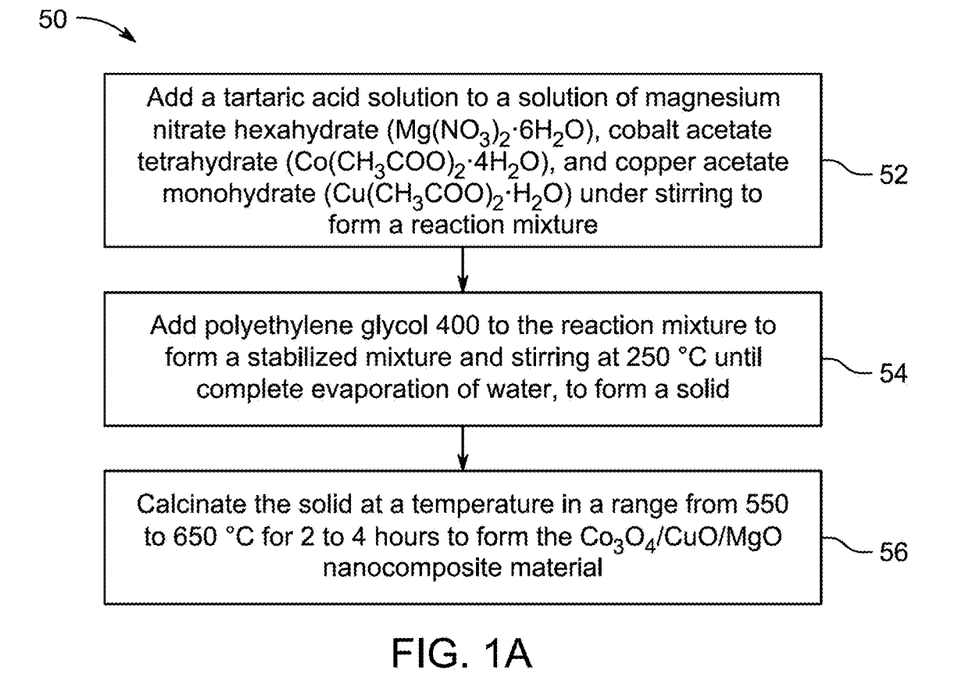
FIG. 1A is a method flowchart for making a $Co_3O_4$/CuO/MgO nanocomposite material, according to certain embodiments.

FIG. 1A illustrates a schematic flow chart of a method 50 of forming a $Co_3O_4/CuO/MgO$ nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes adding a tartaric acid solution to a solution of magnesium nitrate hexahydrate $(Mg(NO_3)_2 \cdot 6H_2O)$, cobalt acetate tetrahydrate $(Co(CH_3COO)_2 \cdot 4H_2O)$, and copper acetate monohydrate $(Cu(CH_3COO)_2 \cdot H_2O)$ under stirring to form a reaction mixture. In some embodiments, other magnesium salts may also be used, for example, magnesium chloride $(MgCl_2)$, magnesium sulfate $(MgSO_4)$, magnesium carbonate $(MgCO_3)$, magnesium oxide (MgO), magnesium fluoride $(MgF_2)$, magnesium bromide $(MgBr_2)$, magnesium iodide $(MgI_2)$, magnesium hydroxide $(Mg(OH)_2)$, magnesium perchlorate, magnesium phosphate $(Mg_3(PO_4)_2)$, magnesium pyrophosphate, magnesium silicate, magnesium borate, magnesium nitrate (anhydrous), magnesium hypophosphite, magnesium tungstate, magnesium thiosulfate, magnesium nitride, magnesium aluminate, and/or mixtures thereof.

In some embodiments, other cobalt salts may also be used, for example, cobalt chloride $(CoCl_2)$, cobalt sulfate $(CoSO_4)$, cobalt nitrate $(Co(NO_3)_2)$, cobalt carbonate $(CoCO_3)$, cobalt oxide (CoO), cobalt hydroxide $(Co(OH)_2)$, cobalt bromide $(CoBr_2)$, cobalt iodide $(CoI_2)$, cobalt fluoride $(CoF_2)$, cobalt phosphate, cobalt pyrophosphate, cobalt silicate, cobalt perchlorate, cobalt thiocyanate, cobalt thiophosphate, cobalt chlorate, cobalt hypophosphite, cobalt aluminate, cobalt tungstate, cobalt molybdate, cobalt selenate, cobalt chromate, and/or mixtures thereof.

In some embodiments, other copper salts may also be used, for example, copper sulfate ($CuSO_4$), copper nitrate ($Cu(NO_3)_2$), copper chloride ($CuCl_2$), copper carbonate ($CuCO_3$), copper oxide (CuO), copper hydroxide ($Cu(OH)_2$), copper bromide ($CuBr_2$), copper iodide (CuI), copper fluoride ($CuF_2$), copper phosphate, copper pyrophosphate, copper silicate, copper perchlorate, copper chlorate, copper nitrite, copper selenite, copper thiocyanate, copper molybdate, copper tungstate, copper chromate, copper borate, copper hypophosphite, copper arsenate, and/or mixtures thereof.

Tartaric acid, a bidentate ligand, can chelate with magnesium, cobalt, and copper ions to form coordination complexes. In some embodiments, other bidentate ligands like acetylacetonate, oxalate, ethylenediamine, bipyridine, etc., may be used as well. The coordination complex formation is dependent on the concentration of tartaric acid concentration. In some embodiments, the concentration of tartaric acid in the reaction mixture may range from 100 to 230 g/L, 150 to 170 g/L, including 150-151 g/L, 151-152 g/L, 152-153 g/L, 153-154 g/L, 154-155 g/L, 155-156 g/L, 156-157 g/L, 157-158 g/L, 158-159 g/L, 159-160 g/L, 160-161 g/L, 161-162 g/L, 162-163 g/L, 163-164 g/L, 164-165 g/L, 165-166 g/L, 166-167 g/L, 167-168 g/L, 168-169 g/L, 169-170 g/L, 150-155 g/L, 155-160 g/L, 160-165 g/L, 165-170 g/L, 150-160 g/L, 160-170 g/L, 150-152 g/L, 152-154 g/L, 154-156 g/L, and 168-170 g/L. In a preferred embodiment, the concentration of tartaric acid in the reaction mixture is 150 g/L.

In some embodiments, the concentration of $Mg(NO_3)_2 \cdot 6H_2O$ in the reaction mixture may range from 55 to 105 g/L, 75 to 85 g/L, including 75-76 g/L, 76-77 g/L, 77-78 g/L, 78-79 g/L, 79-80 g/L, 80-81 g/L, 81-82 g/L, 82-83 g/L, 83-84 g/L, 84-85 g/L, 75-77 g/L, 77-79 g/L, 79-81 g/L, 81-83 g/L, 83-85 g/L, 75-80 g/L, 80-85 g/L, 75-76.5 g/L, 76.5-78 g/L, 78-79.5 g/L, 79.5-81 g/L, 81-82.5 g/L, 82.5-84 g/L, 75-78 g/L, 78-81 g/L, 81-84 g/L, 75-82 g/L, 76-83 g/L, 77-84 g/L, and 78-85 g/L. In a preferred embodiment, the concentration of $Mg(NO_3)_2 \cdot 6H_2O$ in the reaction mixture is 75 g/L.

In some embodiments, the concentration of $Co(CH_3COO)_2 \cdot 4H_2O$ in the reaction mixture may range from 55 to 105 g/L, 75 to 85 g/L, including 75-76 g/L, 76-77 g/L, 77-78 g/L, 78-79 g/L, 79-80 g/L, 80-81 g/L, 81-82 g/L, 82-83 g/L, 83-84 g/L, 84-85 g/L, 75-77 g/L, 77-79 g/L, 79-81 g/L, 81-83 g/L, 83-85 g/L, 75-80 g/L, 80-85 g/L, 75-76.5 g/L, 76.5-78 g/L, 78-79.5 g/L, 77-84 g/L, and 78-85 g/L. In a preferred embodiment, the concentration of $Co(CH_3COO)_2 \cdot 4H_2O$ in the reaction mixture is 75 g/L.

In some embodiments, the concentration of $Cu(CH_3COO)_2 \cdot H_2O$ in the reaction mixture may range from 55 to 105 g/L, 75 to 85 g/L, including 75-76 g/L, 76-77 g/L, 77-78 g/L, 78-79 g/L, 79-80 g/L, 80-81 g/L, 81-82 g/L, 82-83 g/L, 83-84 g/L, 84-85 g/L, 75-77 g/L, 77-79 g/L, 79-81 g/L, 81-83 g/L, 83-85 g/L, 75-80 g/L, 80-85 g/L, 75-76.5 g/L, 76.5-78 g/L, 78-79.5 g/L, 79.5-81 g/L, 81-82.5 g/L, 82.5-84 g/L, 75-78 g/L, 78-81 g/L, 81-84 g/L, 75-82 g/L, 76-83 g/L, 77-84 g/L, and 78-85 g/L. In a preferred embodiment, the concentration of $Cu(CH_3COO)_2 \cdot H_2O$ in the reaction mixture is 75 g/L.

In some embodiments, the tartaric acid solution was added to the solution with continuous stirring for a duration ranging from 1 to 100 min, 10 min to 60 min, including 10-11 min, 11-12 min, 12-13 min, 13-14 min, 14-15 min, 15-16 min, 16-17 min, 17-18 min, 18-19 min, 19-20 min, 20-21 min, 21-22 min, 22-23 min, 23-24 min, 24-25 min, 25-26 min, 26-27 min, 27-28 min, 28-29 min, 29-30 min, 30-31 min, 31-32 min, 32-33 min, 33-34 min, 34-35 min, 35-36 min, 36-37 min, 37-38 min, 38-39 min, 39-40 min. In the preferred embodiment, the tartaric acid solution was added to the solution with continuous stirring for 30 min.

At step 54, the method 50 includes adding polyethylene glycol (PEG) 400 to the reaction mixture to form a stabilized mixture and stirring at 250° C. until complete evaporation of water for forming a solid. PEG-400 serves as a polymeric surfactant or template, enhancing the dispersion of metal ions and reducing the risk of agglomeration. In some embodiments, the concentration of polyethylene glycol 400 in the stabilized mixture ranges from 10 to 100 mL/L, 50 to 60 mL/L, including 50-51 mL/L, 51-52 mL/L, 52-53 mL/L, 53-54 mL/L, 54-55 mL/L, 55-56 mL/L, 56-57 mL/L, 57-58 mL/L, 58-59 mL/L, 59-60 mL/L, 50-52 mL/L, 52-54 mL/L, 54-56 mL/L, 56-58 mL/L, 58-60 mL/L, 50-55 mL/L, 55-60 mL/L, 50-51.5 mL/L, 51.5-53 mL/L, 53-54.5 mL/L, 54.5-56 mL/L, 56-57.5 mL/L, 57.5-59 mL/L, 50-53 mL/L, 53-56 mL/L, 56-59 mL/L, 50-54 mL/L, 54-57 mL/L, 57-60 mL/L. In a preferred embodiment, the concentration of polyethylene glycol 400 in the stabilized mixture is 56 mL/L. In some embodiments, other polymeric surfactants like, PEG, polyvinyl alcohol, polyacrylic acid, polyvinylpyrrolidone, or polymeric templates like polystyrene beads, polyaniline, polyurethane foam, chitosan, etc., may also be used alone or in combination with PEG-400.

At step 56, the method 50 includes calcining the solid at a temperature in a range from 550 to 650° C. for 2 to 4 hours to form the $Co_3O_4/CuO/MgO$ nanocomposite material. This step drives off residual organics (e.g., tartaric acid and PEG) and facilitates the crystallization and formation of the $Co_3O_4$, CuO, and MgO phases. The choice of temperature range and duration helps control the size, phase purity, and distribution of the nanocomposite components. In some embodiments, the solid is calcined at a temperature ranging from 575 to 625° C., including 575-576° C., 576-577° C., 577-578° C., 578-579° C., 579-580° C., 580-581° C., 581-582° C., 582-583° C., 583-584° C., 584-585° C., 585-586° C., 586-587° C., 587-588° C., 588-589° C., 589-590° C., 590-591° C., 591-592° C., 592-593° C., 593-594° C., 594-595° C., 595-596° C., 596-597° C., 597-598° C., 598-599° C., 599-600° C., 600-601° C., 601-602° C., 602-603° C., 603-604° C., 604-605° C. to form the $Co_3O_4/CuO/MgO$ nanocomposite material. In a preferred embodiment, the solid is calcined at 600° C. to form the $Co_3O_4/CuO/MgO$ nanocomposite material.

In some embodiments, the solid is calcined for a duration ranging from 1 to 5 hours, 2 to 4 hours, including 2-2.1 hours, 2.1-2.2 hours, 2.2-2.3 hours, 2.3-2.4 hours, 2.4-2.5 hours, 2.5-2.6 hours, 2.6-2.7 hours, 2.7-2.8 hours, 2.8-2.9 hours, 2.9-3 hours, 3-3.1 hours, 3.1-3.2 hours, 3.2-3.3 hours, 3.3-3.4 hours, 3.4-3.5 hours, 3.5-3.6 hours, 3.6-3.7 hours, 3.7-3.8 hours, 3.8-3.9 hours, 3.9-4 hours, 2-2.5 hours, 2.5-3 hours, 3-3.5 hours, 3.5-4 hours, 2-3 hours, 3-4 hours, 2.1-2.6 hours, 2.6-3.1 hours, 3.1-3.6 hours, 2.2-3.2 hours to form the $Co_3O_4/CuO/MgO$ nanocomposite material. In a preferred embodiment, the solid is calcined for 3 hours to form the $Co_3O_4/CuO/MgO$ nanocomposite material.

According to a second aspect of the present disclosure, a $(Cu_{0.97}Co_{0.03})O/MgO/CoO$ nanocomposite material is described. The nanocomposite material may include crystalline phases, but is not limited to quartz, calcite, hematite, magnetite, goethite, dolomite, albite, anorthite, pyrite, fluorite, halite, barite, apatite, rutile, and zircon. In a preferred embodiment, the $(Cu_{0.97}Co_{0.03})O/MgO/CoO$ nanocomposite exhibits cubic CoO crystalline phases, monoclinic $(Cu_{0.97}Co_{0.03})O$ crystalline phases, and cubic MgO crystalline phases In some embodiments, the average crystallite size of the $(Cu_{0.97}Co_{0.03})O/MgO/CoO$ nanocomposite material ranges from 25 to 85 nm, 45 to 65 nm, including specific ranges such as 45-46 nm, 46-47 nm, 47-48 nm, 48-49 nm, 49-50 nm, 50-51 nm, 51-52 nm, 52-53 nm, 53-54 nm, 54-55 nm, 55-56 nm, 56-57 nm, 57-58 nm, 58-59 nm, 59-60 nm, 60-61 nm, 61-62 nm, 62-63 nm, 63-64 nm, 64-65 nm, as well as broader ranges like 45-50 nm, 50-55 nm, 55-60 nm, 60-65 nm, 45-55 nm, and 55-65 nm. Additional subranges include 45-47.5 nm, 47.5-50 nm, 50-52.5 nm, and 62.5-65 nm. In a preferred embodiment, the average crystallite size is approximately 55.15 nm.

In some embodiments, the morphology of the nanocomposite material may include various nanostructures such as nanowires, nanospheres, nanosheets, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and mixtures thereof. In a preferred embodiment, the nanocomposite material exhibits mainly cuboidal and rectangular morphologies.

In some embodiments, the $(Cu_{0.97}Co_{0.03})O/MgO/CoO$ nanocomposite material consists of granular particles with an average diameter in the range of 100 to 210 nm, 140 to 170 nm. Specific ranges include 140-141 nm, 141-142 nm, 142-143 nm, 143-144 nm, 144-145 nm, 145-146 nm, 146-147 nm, 147-148 nm, 148-149 nm, 149-150 nm, 150-151 nm, 151-152 nm, 152-153 nm, 153-154 nm, 154-155 nm, 155-156 nm, 156-157 nm, 157-158 nm, 158-159 nm, 159-160 nm, 160-161 nm, 161-162 nm, 162-163 nm, 163-164 nm, 164-165 nm, 165-166 nm, 166-167 nm, 167-168 nm, 168-169 nm, and 169-170 nm. In a preferred embodiment, the average diameter of the granular particles is approximately 155.55 nm.

In some embodiments, the atomic concentration of cobalt in the $(Cu_{0.97}Co_{0.33})O/MgO/CoO$ nanocomposite material ranges from 15 to 40%, 25 to 30%, including 25-25.2%, 25.2-25.4%, 25.4-25.6%, 25.6-25.8%, 25.8-26%, 26-26.2%, 26.2-26.4%, 26.4-26.6%, 26.6-26.8%, 26.8-27%, 27-27.2%, 27.2-27.4%, 27.4-27.6%, 27.6-27.8%, 27.8-28%, 28-28.2%, 28.2-28.4%, 28.4-28.6%, 28.6-28.8%, 28.8-29%, 29-29.2%, 29.2-29.4%, 29.4-29.6%, 29.6-29.8%, 29.8-30%, 25-26%, 26-27%, 27-28%, 28-29%, 29-30%. In a preferred embodiment, the atomic concentration of cobalt in the $(Cu_{0.97}Co_{0.33})O/MgO/CoO$ nanocomposite material is 26.80% of the total number of atoms.

In some embodiments, the atomic concentration of copper in the $(Cu_{0.97}Co_{0.33})O/MgO/CoO$ nanocomposite material ranges from 13 to 28%, 18 to 23%, including 18-18.2%, 18.2-18.4%, 18.4-18.6%, 18.6-18.8%, 18.8-19%, 19-19.2%, 19.2-19.4%, 19.4-19.6%, 19.6-19.8%, 19.8-20%, 20-20.2%, 20.2-20.4%, 20.4-20.6%, 20.6-20.8%, 20.8-21%, 21-21.2%, 21.2-21.4%, 21.4-21.6%, 21.6-21.8%, 21.8-22%, 22-22.2%, 22.2-22.4%, 22.4-22.6%, 22.6-22.8%, 22.8-23%, 18-19%, 19-20%, 20-21%, 21-22%, 22-23%. In a preferred embodiment, the atomic concentration of copper in the $(Cu_{0.97}Co_{0.33})O/MgO/CoO$ nanocomposite material is 20.80% of the total number of atoms.

In some embodiments, the atomic concentration of magnesium in the $(Cu_{0.97}Co_{0.33})O/MgO/CoO$ nanocomposite material ranges from 10 to 25%, 15 to 20%, including 15-15.2%, 15.2-15.4%, 15.4-15.6%, 15.6-15.8%, 15.8-16%, 16-16.2%, 16.2-16.4%, 16.4-16.6%, 16.6-16.8%, 16.8-17%, 17-17.2%, 17.2-17.4%, 17.4-17.6%, 17.6-17.8%, 17.8-18%, 18-18.2%, 18.2-18.4%, 18.4-18.6%, 18.6-18.8%, 18.8-19%, 19-19.2%, 19.2-19.4%, 19.4-19.6%, 19.6-19.8%, 19.8-20%, 15-16%, 16-17%, 17-18%, 18-19%, 19-20%. In a preferred embodiment, the atomic concentration of magnesium in the $(Cu_{0.97}Co_{0.33})O/MgO/CoO$ nanocomposite material is 17.10% of the total number of atoms.

Figure 1B:
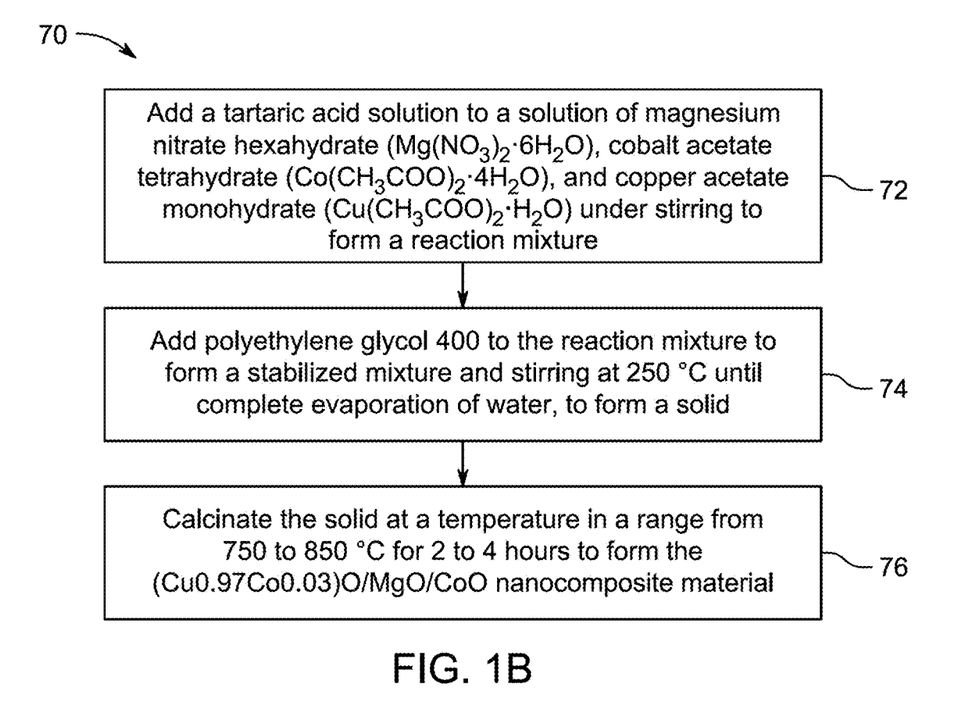
FIG. 1B is a method flowchart for making a $(Cu_{0.97}Co_{0.03})O$/MgO/CoO nanocomposite material, according to certain embodiments.

FIG. 1B illustrates a schematic flow chart of a method 70 of forming a $(Cu_{0.97}Co_{0.03})O/MgO/CoO$ nanocomposite. The order in which the method 70 is described is not intended to be construed as a limitation, and any number of the described method steps can be combined to implement the method 70. Additionally, individual steps may be removed or skipped from the method 70 without departing from the spirit and scope of the present disclosure.

At step 72, the method 70 includes adding a tartaric acid solution to a solution of magnesium nitrate hexahydrate $(Mg(NO_3)_2 \cdot 6H_2O)$, cobalt acetate tetrahydrate $(Co(CH_3COO)_2 \cdot 4H_2O)$, and copper acetate monohydrate $(Cu(CH_3COO)_2 \cdot H_2O)$ under stirring to form a reaction mixture. In some embodiments, other magnesium salts may also be used, for example, magnesium chloride $(MgCl_2)$, magnesium sulfate $(MgSO_4)$, magnesium carbonate $(MgCO_3)$, magnesium oxide (MgO), magnesium fluoride $(MgF_2)$, magnesium bromide $(MgBr_2)$, magnesium iodide $(MgI_2)$, magnesium hydroxide $(Mg(OH)_2)$, magnesium perchlorate, magnesium phosphate $(Mg_3(PO_4)_2)$, magnesium pyrophosphate, magnesium silicate, magnesium borate, magnesium nitrate (anhydrous), magnesium hypophosphite, magnesium tungstate, magnesium thiosulfate, magnesium nitride, magnesium aluminate, and/or mixtures thereof.

In some embodiments, other cobalt salts may also be used, for example, cobalt chloride $(CoCl_2)$, cobalt sulfate $(CoSO_4)$, cobalt nitrate $(Co(NO_3)_2)$, cobalt carbonate $(CoCO_3)$, cobalt oxide (CoO), cobalt hydroxide $(Co(OH)_2)$, cobalt bromide $(CoBr_2)$, cobalt iodide $(CoI_2)$, cobalt fluoride $(CoF_2)$, cobalt phosphate, cobalt pyrophosphate, cobalt silicate, cobalt perchlorate, cobalt thiocyanate, cobalt thiophosphate, cobalt chlorate, cobalt hypophosphite, cobalt aluminate, cobalt tungstate, cobalt molybdate, cobalt selenate, cobalt chromate, and/or mixtures thereof.

In some embodiments, other copper salts may also be used, for example, copper sulfate $(CuSO_4)$, copper nitrate $(Cu(NO_3)_2)$, copper chloride $(CuCl_2)$, copper carbonate $(CuCO_3)$, copper oxide (CuO), copper hydroxide $(Cu(OH)_2)$, copper bromide $(CuBr_2)$, copper iodide (CuI), copper fluoride $(CuF_2)$, copper phosphate, copper pyrophosphate, copper silicate, copper perchlorate, copper chlorate, copper nitrite, copper selenite, copper thiocyanate, copper molybdate, copper tungstate, copper chromate, copper borate, copper hypophosphite, copper arsenate, and/or mixtures thereof.

Tartaric acid, a bidentate ligand, can chelate with magnesium, cobalt, and copper ions to form coordination complexes. In some embodiments, other bidentate ligands like acetylacetonate, oxalate, ethylenediamine, bipyridine, etc., may be used as well. The coordination complex formation is dependent on the concentration of tartaric acid concentration. In some embodiments, the concentration of tartaric acid in the reaction mixture may range from 110 to 210 g/L, 150 to 170 g/L, including 150-151 g/L, 151-152 g/L, 152-153 g/L, 153-154 g/L, 154-155 g/L, 155-156 g/L, 156-157 g/L, 157-158 g/L, 158-159 g/L, 159-160 g/L, 160-161 g/L, 161-162 g/L, 162-163 g/L, 163-164 g/L, 164-165 g/L, 165-166 g/L, 166-167 g/L, 167-168 g/L, 168-169 g/L, 169-170 g/L, 150-155 g/L, 155-160 g/L, 160-165 g/L, 165-170 g/L, 150-160 g/L, 160-170 g/L, 150-152 g/L, 152-154 g/L, 154-156 g/L, and 168-170 g/L. In a preferred embodiment, the concentration of tartaric acid in the reaction mixture is 150 g/L.

In some embodiments, the concentration of Mg(NO$_3$)$_2$·6H$_2$O in the reaction mixture may range from 55 to 105 g/L, 75 to 85 g/L, including 75-76 g/L, 76-77 g/L, 77-78 g/L, 78-79 g/L, 79-80 g/L, 80-81 g/L, 81-82 g/L, 82-83 g/L, 83-84 g/L, 84-85 g/L, 75-77 g/L, 77-79 g/L, 79-81 g/L, 81-83 g/L, 83-85 g/L, 75-80 g/L, 80-85 g/L, 75-76.5 g/L, 76.5-78 g/L, 78-79.5 g/L, 79.5-81 g/L, 81-82.5 g/L, 82.5-84 g/L, 75-78 g/L, 78-81 g/L, 81-84 g/L, 75-82 g/L, 76-83 g/L, 77-84 g/L, and 78-85 g/L. In a preferred embodiment, the concentration of Mg(NO$_3$)$_2$·6H$_2$O in the reaction mixture is 75 g/L.

In some embodiments, the concentration of Co(CH$_3$COO)$_2$·4H$_2$O in the reaction mixture may range from 55 to 105 g/L, 75 to 85 g/L, including 75-76 g/L, 76-77 g/L, 77-78 g/L, 78-79 g/L, 79-80 g/L, 80-81 g/L, 81-82 g/L, 82-83 g/L, 83-84 g/L, 84-85 g/L, 75-77 g/L, 77-79 g/L, 79-81 g/L, 81-83 g/L, 83-85 g/L, 75-80 g/L, 80-85 g/L, 75-76.5 g/L, 76.5-78 g/L, 78-79.5 g/L, 79.5-81 g/L, 81-82.5 g/L, 82.5-84 g/L, 75-78 g/L, 78-81 g/L, 81-84 g/L, 75-82 g/L, 76-83 g/L, 77-84 g/L, and 78-85 g/L. In a preferred embodiment, the concentration of Co(CH$_3$COO)$_2$·4H$_2$O in the reaction mixture is 75 g/L.

In some embodiments, the concentration of Cu(CH$_3$COO)$_2$·H$_2$O in the reaction mixture may range from 55 to 105 g/L, 75 to 85 g/L, including 75-76 g/L, 76-77 g/L, 77-78 g/L, 78-79 g/L, 79-80 g/L, 80-81 g/L, 81-82 g/L, 82-83 g/L, 83-84 g/L, 84-85 g/L, 75-77 g/L, 77-79 g/L, 79-81 g/L, 81-83 g/L, 83-85 g/L, 75-80 g/L, 80-85 g/L, 75-76.5 g/L, 76.5-78 g/L, 78-79.5 g/L, 77-84 g/L, and 78-85 g/L. In a preferred embodiment, the concentration of Cu(CH$_3$COO)$_2$·H$_2$O in the reaction mixture is 75 g/L.

In some embodiments, the tartaric acid solution was added to the solution with continuous stirring for a duration ranging from 1 to 100 min, 10 min to 60 min, including 10-11 min, 11-12 min, 12-13 min, 13-14 min, 14-15 min, 15-16 min, 16-17 min, 17-18 min, 18-19 min, 19-20 min, 20-21 min, 21-22 min, 22-23 min, 23-24 min, 24-25 min, 25-26 min, 26-27 min, 27-28 min, 28-29 min, 29-30 min, 30-31 min, 31-32 min, 32-33 min, 33-34 min, 34-35 min, 35-36 min, 36-37 min, 37-38 min, 38-39 min, 39-40 min. In the preferred embodiment, the tartaric acid solution was added to the solution with continuous stirring for 30 min.

At step 74, the method 70 includes adding polyethylene glycol 400 to the reaction mixture to form a stabilized mixture and stirring at 250° C. until complete evaporation of water, forming a solid. PEG-400 serves as a polymeric surfactant or template, enhancing the dispersion of metal ions and reducing the risk of agglomeration. In some embodiments, the concentration of polyethylene glycol 400 in the stabilized mixture ranges from 10 to 100 mL/L, 50 to 60 mL/L, including 50-51 mL/L, 51-52 mL/L, 52-53 mL/L, 53-54 mL/L, 54-55 mL/L, 55-56 mL/L, 56-57 mL/L, 57-58 mL/L, 58-59 mL/L, 59-60 mL/L, 50-52 mL/L, 52-54 mL/L, 54-56 mL/L, 56-58 mL/L, 58-60 mL/L, 50-55 mL/L, 55-60 mL/L, 50-51.5 mL/L, 51.5-53 mL/L, 53-54.5 mL/L, 54.5-56 mL/L, 56-57.5 mL/L, 57.5-59 mL/L, 50-53 mL/L, 53-56 mL/L, 56-59 mL/L, 50-54 mL/L, 54-57 mL/L, 57-60 mL/L. In a preferred embodiment, the concentration of polyethylene glycol 400 in the stabilized mixture is 56 mL/L. In some embodiments, other polymeric surfactants like, PEG, polyvinyl alcohol, polyacrylic acid, polyvinylpyrrolidone, or polymeric templates like polystyrene beads, polyaniline, polyurethane foam, chitosan, etc., may also be used alone or in combination with PEG-400.

At step 76, the method 70 includes calcining the solid at a temperature in a range from 750 to 850° C. for 2 to 4 hours to form the (Cu$_{0.97}$Co$_{0.03}$)O/MgO/CoO nanocomposite material. This step drives off residual organics (e.g., tartaric acid and PEG) and facilitates the crystallization and formation of the Co$_3$O$_4$, CuO, and MgO phases. The choice of temperature range and duration helps control the size, phase purity, and distribution of the nanocomposite components. In some embodiments, the solid is calcined at a temperature ranging from 775 to 825° C., including 775-776° C., 776-777° C., 777-778° C., 778-779° C., 779-780° C., 780-781° C., 781-782° C., 782-783° C., 783-784° C., 784-785° C., 785-786° C., 786-787° C., 787-788° C., 788-789° C., 789-790° C., 790-791° C., 791-792° C., 792-793° C., 793-794° C., 794-795° C., 795-796° C., 796-797° C., 797-798° C., 798-799° C., 799-800° C., 800-801° C., 801-802° C., 802-803° C., 803-804° C., 804-805° C. to form the (Cu$_{0.97}$Co$_{0.03}$)O/MgO/CoO nanocomposite material. In the preferred embodiment, the solid is calcined at 800° C. to form the (Cu$_{0.97}$Co$_{0.03}$)O/MgO/CoO nanocomposite material.

In some embodiments, the solid is calcined for a duration ranging from 1 to 5 hours, 2 to 4 hours, including 2-2.1 hours, 2.1-2.2 hours, 2.2-2.3 hours, 2.3-2.4 hours, 2.4-2.5 hours, 2.5-2.6 hours, 2.6-2.7 hours, 2.7-2.8 hours, 2.8-2.9 hours, 2.9-3 hours, 3-3.1 hours, 3.1-3.2 hours, 3.2-3.3 hours, 3.3-3.4 hours, 3.4-3.5 hours, 3.5-3.6 hours, 3.6-3.7 hours, 3.7-3.8 hours, 3.8-3.9 hours, 3.9-4 hours, 2-2.5 hours, 2.5-3 hours, 3-3.5 hours, 3.5-4 hours, 2-3 hours, 3-4 hours, 2.1-2.6 hours, 2.6-3.1 hours, 3.1-3.6 hours, 2.2-3.2 hours to form the (Cu$_{0.97}$Co$_{0.03}$)O/MgO/CoO nanocomposite material. In the preferred embodiment, the solid is calcined for 3 hours to form the (Cu$_{0.91}$Co$_{0.03}$) O/MgO/CoO nanocomposite material.

EXAMPLES

The following examples demonstrate a Co$_3$O$_4$/CuO/MgO nanocomposite material. The examples are provided solely for illustration and are not to be construed as limitations of the present disclosure, as many variations thereof are possible without departing from the spirit and scope of the present disclosure.

Figure 1C:
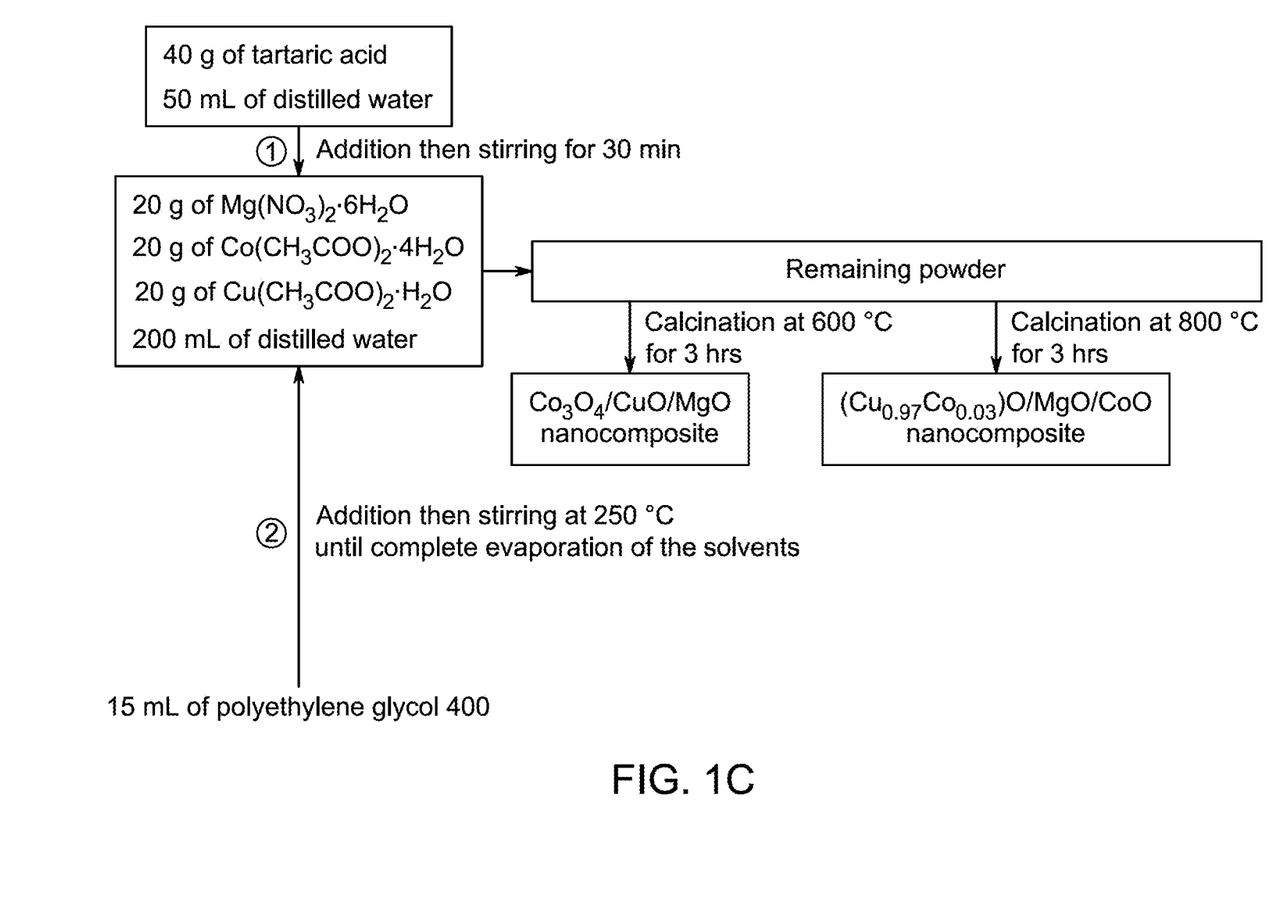
FIG. 1C shows experimental steps for the production of $Co_3O_4$/CuO/MgO and $(Cu_{0.97}Co_{0.03})O$/MgO/CoO nanocomposites, according to certain embodiments.

Example 1: Synthesis of Co$_3$O$_4$/CuO/MgO and (Cu$_{0.97}$Co$_{0.03}$)O/MgO/CoO Nanocomposites Using Pechini Sol-Gel Method The synthesis of Co$_3$O$_4$/CuO/MgO and (Cu$_{0.97}$Co$_{0.03}$)O/MgO/CoO nanocomposites was carried out using the Pechini sol-gel method, as illustrated in FIG. 1C. Initially, 40 g of tartaric acid was dissolved in 50 mL of distilled water. Separately, 20 g of magnesium nitrate hexahydrate (Mg(NO$_3$)$_2$·6H$_2$O), 20 g of cobalt acetate tetrahydrate (Co(CH$_3$COO)$_2$·4H$_2$O), and 20 g of copper acetate monohydrate (Cu(CH$_3$COO)$_2$·H$_2$O) were dissolved in 200 mL of distilled water. The tartaric acid solution was then added to the metal nitrate solution with continuous stirring for 30 min to lead to homogeneity. Subsequently, 15 mL of polyethylene glycol 400 was introduced into the mixture under continuous stirring, and the resulting solution was heated to 250° C. to evaporate the solvents completely. The resulting powder was calcined at 600° C. for 3 hrs to synthesize the Co$_3$O$_4$/CuO/MgO nanocomposite and at 800° C. for 3 hrs to obtain the (Cu$_{0.97}$Co$_{0.03}$)O/MgO/CoO nanocomposite.

Figure 2A:
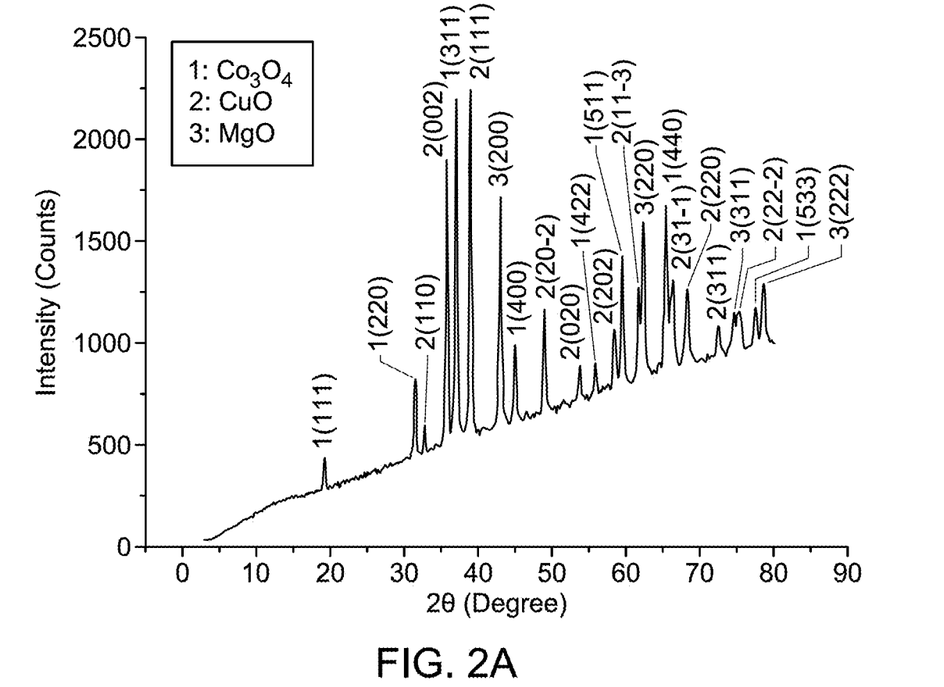
FIG. 2A illustrates X-ray diffraction (XRD) pattern of the $Co_3O_4$/CuO/MgO nanocomposite synthesized at 600° C., according to certain embodiments.
Figure 2B:
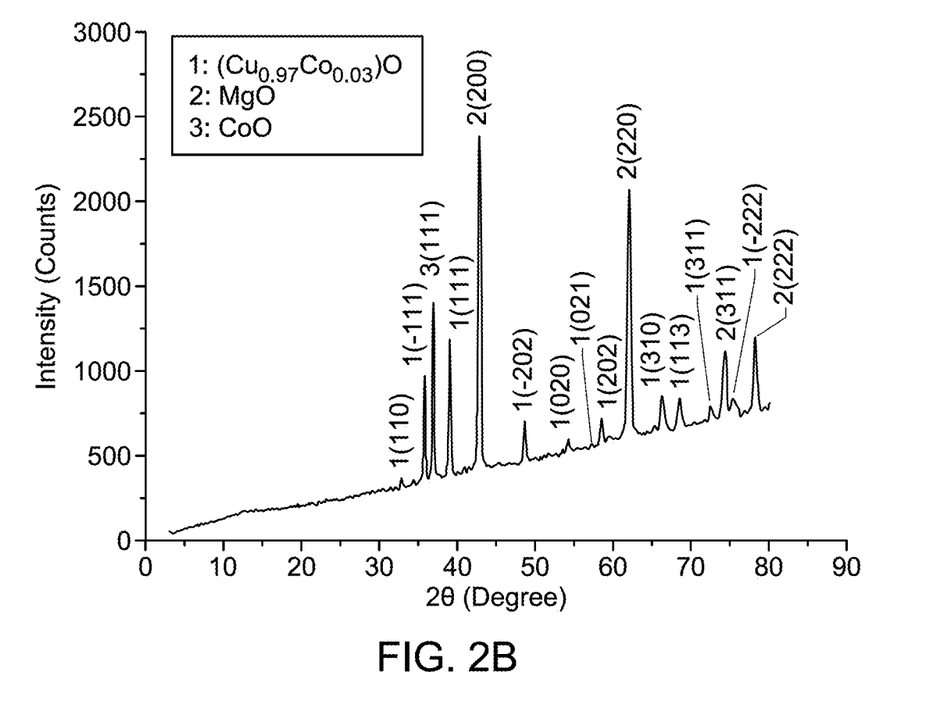
FIG. 2B shows a XRD pattern for the $(Cu_{0.97}Co_{0.03})O$/MgO/CoO nanocomposite material synthesized at 800° C. using Pechini sol-gel method, according to certain embodiments.

The X-ray diffraction (XRD) patterns presented in FIG. 2A and FIG. 2B illustrate the patterns of $Co_3O_4$/CuO/MgO and $(Cu_{0.97}Co_{0.03})$O/MgO/CoO nanocomposites synthesized using the Pechini sol-gel method at 600 and 800° C., respectively. The $Co_3O_4$ phase in the $Co_3O_4$/CuO/MgO nanocomposite, synthesized at 600° C., corresponds to the cubic crystal system with JCPDS No. 01-076-1802. Its characteristic peaks are observed at 2Θ angles of 19.04, 31.39, 36.98, 44.97, 55.79, 59.55, 65.39, and 77.35, indexed as (111), (220), (311), (400), (422), (511), (440), and (533), respectively. The CuO phase, with a monoclinic crystal system and COD-9016105, shows peaks at 2Θ angles of 32.75, 35.74, 38.86, 48.95, 53.68, 58.42, 61.67, 66.26, 68.25, 72.37, and 75.25, indexed as (110), (002), (111), (20-2), (020), (202), (11-3), (31-1), (220), (311), and (22-2), respectively. The MgO phase, indexed to a cubic crystal system with JCPDS No. 01-087-0653, has diffraction peaks at 2Θ angles of 42.98, 62.28, 74.62, and 78.60, corresponding to (200), (220), (311), and (222), respectively. The average crystallite size of the $Co_3O_4$/CuO/MgO nanocomposite was calculated as 59.66 nm. The $(Cu_{0.97}Co_{0.03})$O/MgO/CoO nanocomposite synthesized at 800° C. includes $(Cu_{0.97}Co_{0.03})$O as a monoclinic phase with JCPDS No. 01-085-7185, showing diffraction peaks at 2Θ angles of 32.69, 35.64, 38.95, 48.63, 54.17, 57.25, 58.42, 66.22, 68.46, 72.48, and 75.43, indexed as (110), (-111), (111), (-202), (020), (021), (202), (310), (113), (311), and (-222), respectively. The MgO phase, indexed to a cubic crystal system with JCPDS No. 01-087-0653, shows diffraction peaks at 2Θ angles of 42.98, 62.28, 74.62, and 78.60, corresponding to (200), (220), (311), and (222), respectively. The CoO phase, with a cubic crystal system and JCPDS No. 01-077-7548, exhibits a characteristic diffraction peak at 2Θ angle of 36.83, indexed as (111). The average crystallite size of the $(Cu_{0.97}Co_{0.03})$O/MgO/CoO nanocomposite was calculated as 55.15 nm.

Figure 3A:
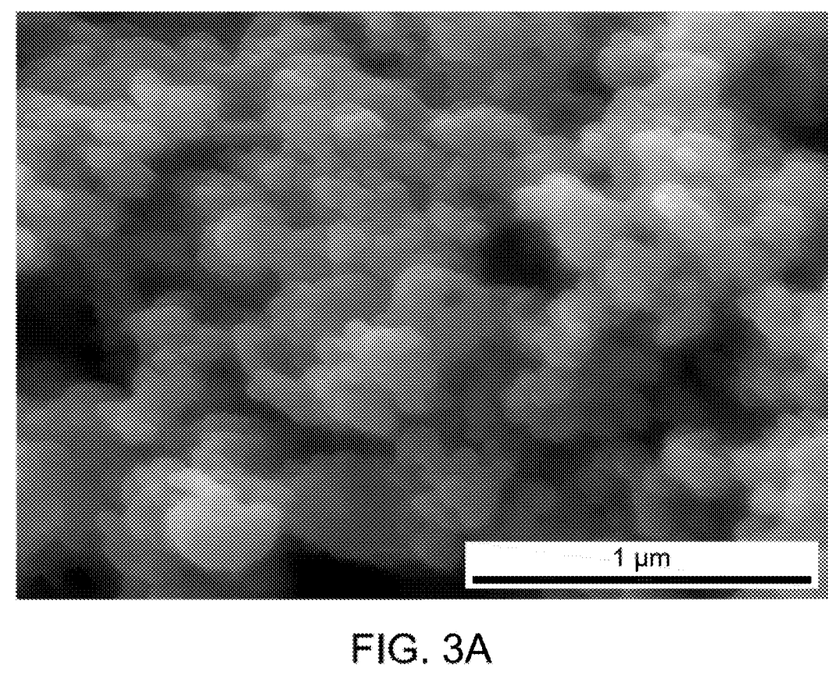
FIG. 3A shows scanning electron microscope (SEM) images of the $Co_3O_4$/CuO/MgO nanocomposite synthesized at 600° C., according to certain embodiments.
Figure 3B:
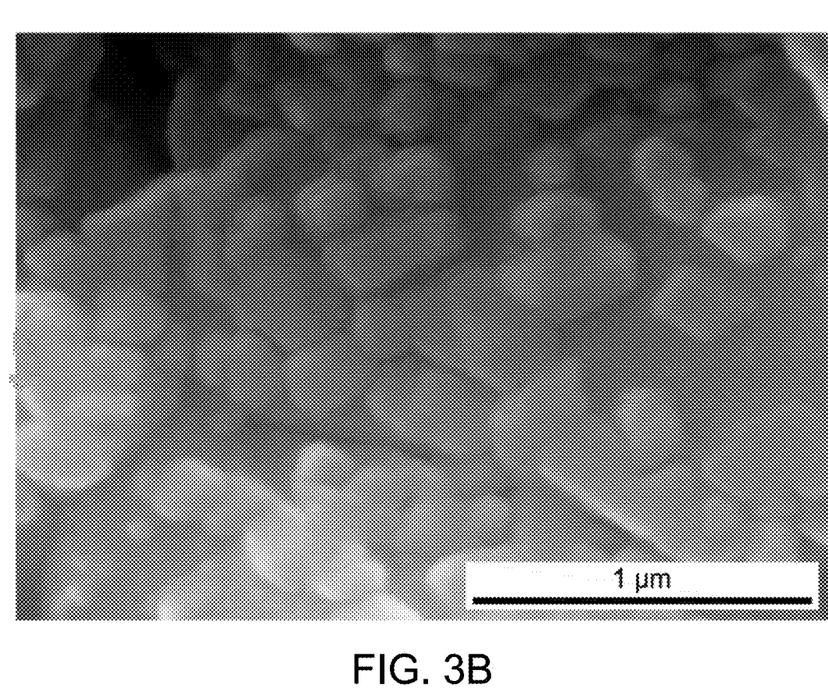
FIG. 3B shows SEM images of the $(Cu_{0.97}Co_{0.03})O$/MgO/CoO nanocomposite material synthesized at 800° C. using the Pechini sol-gel method, according to certain embodiments.

FIG. 3A and FIG. 3B presents the scanning electron microscope (SEM) images of $Co_3O_4$/CuO/MgO and $(Cu_{0.97}Co_{0.03})$O/MgO/CoO nanocomposites synthesized via the Pechini sol-gel method at 600 and 800° C., respectively. In FIG. 3A, corresponding to the $Co_3O_4$/CuO/MgO nanocomposite, the particles exhibit irregularly aggregated shapes characterized by spherical and nearly rounded structures. Conversely, FIG. 3B, depicting the $(Cu_{0.97}Co_{0.03})$O/MgO/CoO nanocomposite, reveals well-defined cuboidal and rectangular particles, indicating increased crystallinity at the higher synthesis temperature. The average grain size of the $Co_3O_4$/CuO/MgO nanocomposite synthesized at 600° C. was 85.37 nm, whereas the average grain size of the $(Cu_{0.97}Co_{0.03})$O/MgO/CoO nanocomposite synthesized at 800° C. was larger, averaging 155.55 nm. These observations highlight the influence of temperature on particle morphology and size, with higher temperatures promoting the growth of larger, more crystalline structures.

Figure 4A:
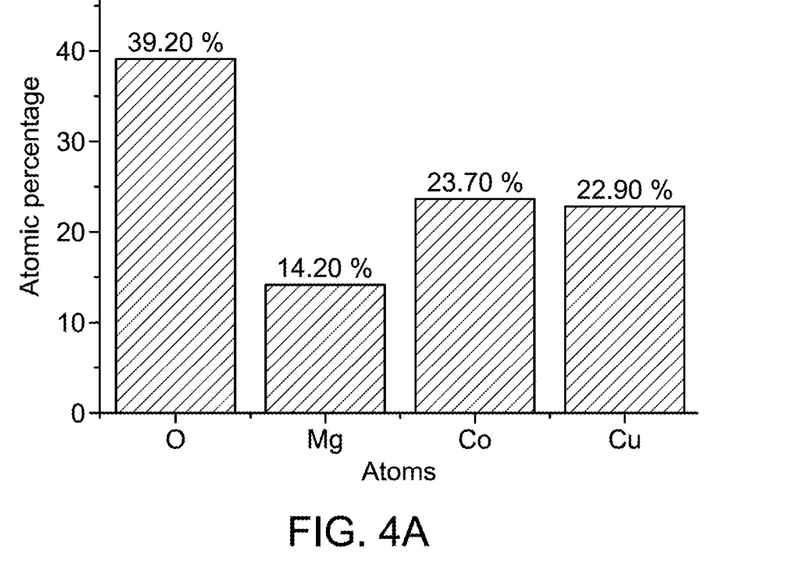
FIG. 4A is a graph showing the atomic percentage distribution of elements in the $Co_3O_4$/CuO/MgO nanocomposite synthesized at 600° C., as determined by energy-dispersive X-ray spectroscopy (EDX) analysis, according to certain embodiments.
Figure 4B:
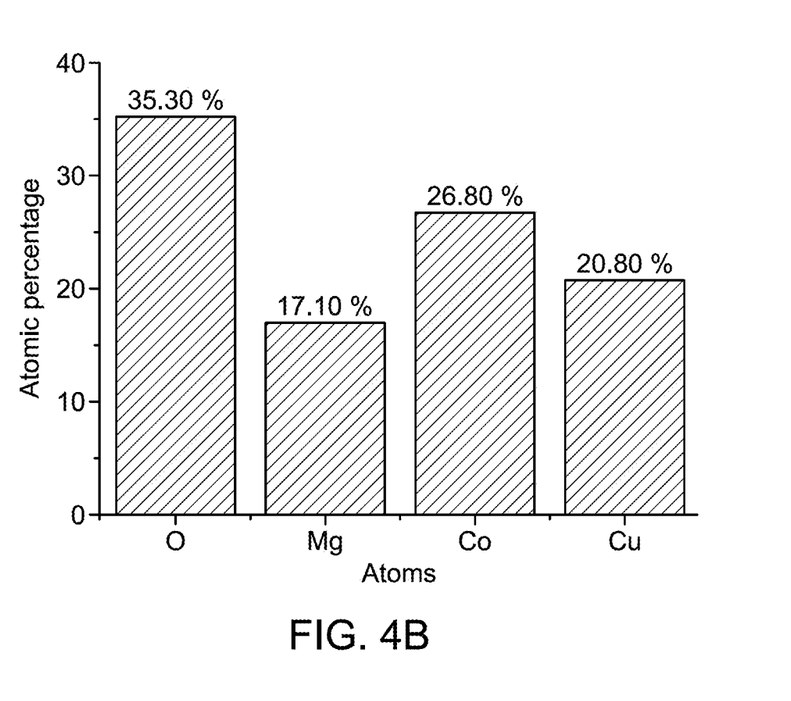
FIG. 4B is a graph illustrating the atomic percentage distribution of elements in the $(Cu_{0.97}Co_{0.03})O$/MgO/CoO nanocomposite material synthesized at 800° C., as determined by EDX analysis, according to certain embodiments.

FIG. 4A and FIG. 4B illustrates the atomic percentage distribution of elements within the $Co_3O_4$/CuO/MgO nanocomposite synthesized at 600° C. and the $(Cu_{0.97}Co_{0.03})$O/MgO/CoO nanocomposite synthesized at 800° C., respectively, as determined by energy-dispersive X-ray spectroscopy (EDX) analysis. In the nanocomposite synthesized at 600° C. (FIG. 4A), the atomic percentages of oxygen, magnesium, cobalt, and copper were determined as 39.20%, 14.20%, 23.70%, and 22.90%, respectively. For the nanocomposite synthesized at 800° C. (FIG. 4B), the atomic percentages of oxygen, magnesium, cobalt, and copper shifted to 35.30%, 17.10%, 26.80%, and 20.80%, respectively. The observed decrease in oxygen percentage at higher synthesis temperatures can be attributed to the partial reduction or decomposition of oxygen-containing phases during thermal treatment. The increase in the percentage of cobalt and magnesium may result from their enhanced diffusion and crystallization at higher temperatures, stabilizing their phases. The slight decrease in copper content might be due to volatilization or changes in the oxidation state at elevated temperatures. These changes reflect the thermal stability and phase composition of the nanocomposites, highlighting the influence of synthesis temperature on the elemental distribution and phase development.

Nanocomposites such as $Co_3O_4$/CuO/MgO and $(Cu_{0.97}Co_{0.03})$O/MgO/CoO hold immense potential for commercial applications in catalysis, offering enhanced efficiency and stability for industrial chemical processes. Their enhanced thermal stability and multi-phase composition make them ideal for advanced energy storage devices, including batteries and supercapacitors, improving performance and longevity. Additionally, these nanocomposites can be employed in environmental remediation technologies, such as wastewater treatment and pollutant adsorption.

To summarize, the present disclosure involves the facile fabrication of $Co_3O_4$/CuO/MgO and $(Cu_{0.97}Co_{0.03})$O/MgO/CoO nanocomposites using the Pechini sol-gel method at 600 and 800° C., respectively, focusing on the unique integration of multiple phases to produce advanced materials with enhanced structural and morphological properties. The present disclosure focuses on the development of multi-phase nanocomposites with enhanced crystallinity, tailored grain sizes, and precise elemental distributions, which have not been achieved in prior studies. The X-ray diffraction (XRD) analysis confirmed the formation of the $Co_3O_4$ phase with a cubic crystal structure, CuO with a monoclinic structure, MgO with a cubic structure, CoO with a cubic structure, and the $(Cu_{0.97}Co_{0.03})$O phase with a monoclinic structure. The average crystallite sizes of the $Co_3O_4$/CuO/MgO and $(Cu_{0.97}Co_{0.03})$O/MgO/CoO nanocomposites were 59.66 nm and 55.15 nm, respectively. Scanning electron microscopy (SEM) revealed that the $Co_3O_4$/CuO/MgO nanocomposite synthesized at 600° C. exhibited spherical and rounded particle morphologies with an average grain size of 85.37 nm, whereas the $(Cu_{0.97}Co_{0.03})$O/MgO/CoO nanocomposite synthesized at 800° C. demonstrated cuboidal and rectangular morphologies with an average grain size of 155.55 nm. These differences highlight the impact of calcination temperature on the morphological evolution of the composites. Energy-dispersive X-ray spectroscopy (EDX) confirmed the elemental composition of the nanocomposites and demonstrated the influence of synthesis temperature on atomic percentage distribution. The $Co_3O_4$/CuO/MgO composite synthesized at 600° C. had higher oxygen content compared to the composite synthesized at 800° C., while the latter exhibited increased cobalt and magnesium percentages due to enhanced crystallization at higher temperatures. These results underline the ability of the nanocomposite material of the present disclosure to manipulate and control material properties through systematic synthesis strategies, offering an advancement over existing technologies in the development of multifunctional nanocomposites.

Numerous modifications and variations of the present disclosure are possible in light of the above teachings. It is, therefore, to be understood that within the scope of the appended claims, the invention may be practiced otherwise than as specifically described herein.

The invention claimed is:

1. A $Co_3O_4$/CuO/MgO nanocomposite material, comprising:
    a cubic $Co_3O_4$ crystalline phase;
    a monoclinic CuO crystalline phase; and
    a cubic MgO crystalline phase;
    wherein the average crystallite size of the $Co_3O_4$/CuO/MgO nanocomposite material is in a range from 50 to 70 nm, and
    wherein the $Co_3O_4$/CuO/MgO nanocomposite material has a granular morphology comprising granular particles with an average diameter in a range from 75 to 95 nm.

2. The $Co_3O_4$/CuO/MgO nanocomposite material of claim 1, wherein the average crystallite size of the $Co_3O_4$/CuO/MgO nanocomposite material is in a range from 55 to 65 nm.

3. The $Co_3O_4$/CuO/MgO nanocomposite material of claim 1, wherein the average diameter of the granular particles is in a range from 80 to 90 nm.

4. The $Co_3O_4$/CuO/MgO nanocomposite material of claim 1, wherein the atomic concentration of cobalt in the $Co_3O_4$/CuO/MgO nanocomposite material is in a range from 20 to 25% of the total number of atoms, the atomic concentration of copper in the $Co_3O_4$/CuO/MgO nanocomposite material is in a range from 20 to 25% of the total number of atoms, and the atomic concentration of magnesium in the $Co_3O_4$/CuO/MgO nanocomposite material is in a range from 12 to 18% of the total number of atoms.

5. The $Co_3O_4$/CuO/MgO nanocomposite material of claim 4, wherein the atomic concentration of cobalt in the $Co_3O_4$/CuO/MgO nanocomposite material is in a range from 23 to 24.5% of the total number of atoms, the atomic concentration of copper in the $Co_3O_4$/CuO/MgO nanocomposite material is in a range from 22 to 24% of the total number of atoms, and the atomic concentration of magnesium in the $Co_3O_4$/CuO/MgO nanocomposite material is in a range from 13 to 15% of the total number of atoms.

6. A $(Cu_{0.97}Co_{0.03})$O/MgO/CoO nanocomposite material, comprising:
    cubic CoO crystalline phases;
    monoclinic $(Cu_{0.97}Co_{0.03})$O crystalline phases; and
    cubic MgO crystalline phases;
    wherein the average crystallite size of the $(Cu_{0.97}Co_{0.03})$O/MgO/CoO nanocomposite material is in a range from 45 to 65 nm, and
    wherein the $(Cu_{0.97}Co_{0.03})$O/MgO/CoO nanocomposite material has a granular morphology comprising granular particles with an average diameter in a range from 140 to 170 nm.

7. The $(Cu_{0.97}Co_{0.03})$O/MgO/CoO nanocomposite material of claim 6, wherein the average crystallite size of the $(Cu_{0.97}Co_{0.03})$O/MgO/CoO nanocomposite material is in a range from 50 to 60 nm.

8. The $(Cu_{0.97}Co_{0.03})$O/MgO/CoO nanocomposite material of claim 6, wherein the average diameter of the granular particles is in a range from 150 to 160 nm.

9. The $(Cu_{0.97}Co_{0.03})$O/MgO/CoO nanocomposite material of claim 6, wherein the atomic concentration of cobalt in the $(Cu_{0.97}Co_{0.03})$O/MgO/CoO nanocomposite material is in a range from 25 to 30% of the total number of atoms, the atomic concentration of copper in the $(Cu_{0.97}Co_{0.03})$O/MgO/CoO nanocomposite material is in a range from 18 to 23% of the total number of atoms, and the atomic concentration of magnesium in the $(Cu_{0.97}Co_{0.03})$O/MgO/CoO nanocomposite material is in a range from 15 to 20% of the total number of atoms.

10. The $(Cu_{0.97}Co_{0.03})$O/MgO/CoO nanocomposite material of claim 9, wherein the atomic concentration of cobalt in the $(Cu_{0.97}Co_{0.03})$O/MgO/CoO nanocomposite material is in a range from 26 to 28% of the total number of atoms, the atomic concentration of copper in the $(Cu_{0.97}Co_{0.03})$O/MgO/CoO nanocomposite material is in a range from 20 to 22% of the total number of atoms, and the atomic concentration of magnesium in the $(Cu_{0.97}Co_{0.03})$O/MgO/CoO nanocomposite material is in a range from 16-18% of the total number of atoms.

11. A method for making the $Co_3O_4$/CuO/MgO nanocomposite material of claim 1, comprising:
    adding a tartaric acid solution to a solution of magnesium nitrate hexahydrate $(Mg(NO_3)_2 \cdot 6H_2O)$, cobalt acetate tetrahydrate $(Co(CH_3COO)_2 \cdot 4H_2O)$, and copper acetate monohydrate $(Cu(CH_3COO)_2 \cdot H_2O)$ under stirring to form a reaction mixture;
    adding polyethylene glycol 400 to the reaction mixture to form a stabilized mixture and stirring at 250° C. until complete evaporation of water, forming a solid; and
    calcining the solid at a temperature in a range from 550 to 650° C. for 2 to 4 hours to form the $Co_3O_4$/CuO/MgO nanocomposite material.

12. The method of claim 11, wherein the solid is calcined at a temperature in a range from 575 to 625° C. for 2 to 4 hours to form the $Co_3O_4$/CuO/MgO nanocomposite material.

13. The method of claim 11, wherein the solid is calcined at 600° C. for 3 hours to form the $Co_3O_4$/CuO/MgO nanocomposite material.

14. The method of claim 11, wherein the concentration of tartaric acid in the reaction mixture is in a range from 150 to 170 g/L, the concentration of $Mg(NO_3)_2 \cdot 6H_2O$ in the reaction mixture is in a range from 75 to 85 g/L, the concentration of $Co(CH_3COO)_2 \cdot 4H_2O$ in the reaction mixture is in a range from 75 to 85 g/L, and the concentration of $Cu(CH_3COO)_2 \cdot H_2O$ in the reaction mixture is in a range from 75 to 85 g/L.

15. The method of claim 11, wherein the concentration of polyethylene glycol 400 in the stabilized mixture is in a range from 50 to 60 ml per liter of stabilized mixture.

16. A method for making the $(Cu_{0.97}Co_{0.03})$O/MgO/CoO nanocomposite material of claim 6, comprising:
    adding a tartaric acid solution to a solution of magnesium nitrate hexahydrate $(Mg(NO_3)_2 \cdot 6H_2O)$, cobalt acetate tetrahydrate $(Co(CH_3COO)_2 \cdot 4H_2O)$, and copper acetate monohydrate $(Cu(CH_3COO)_2 \cdot H_2O)$ under stirring to form a reaction mixture;
    adding polyethylene glycol 400 to the reaction mixture to form a stabilized mixture and stirring at 250° C. until complete evaporation of water, forming a solid; and
    calcining the solid at a temperature in a range from 750 to 850° C. for 2 to 4 hours to form the $(Cu_{0.97}Co_{0.03})$O/MgO/CoO nanocomposite material.

17. The method of claim 16, wherein the solid is calcined at a temperature in a range from 775 to 825° C. for 2 to 4 hours to form the $(Cu_{0.97}Co_{0.03})$O/MgO/CoO nanocomposite material.

18. The method of claim 16, wherein the solid is calcined at a 800° C. for 3 hours to form the $(Cu_{0.97}Co_{0.03})$O/MgO/CoO nanocomposite material.

19. The method of claim 16, wherein the concentration of tartaric acid in the reaction mixture is in a range from 150 to 170 g/L, the concentration of $Mg(NO_3)_2 \cdot 6H_2O$ in the reaction mixture is in a range from 75 to 85 g/L, the concentration of $Co(CH_3COO)_2 \cdot 4H_2O$ in the reaction mixture is in a range from 75 to 85 g/L, and the concentration of $Cu(CH_3COO)_2 \cdot H_2O$ in the reaction mixture is in a range from 75 to 85 g/L.

20. The method of claim 16, wherein the concentration of polyethylene glycol 400 in the stabilized mixture is in a range from 50 to 60 ml per liter of stabilized mixture.

\* \* \* \* \*